(12) United States Patent
Sen et al.

(10) Patent No.: US 6,765,909 B1
(45) Date of Patent: Jul. 20, 2004

(54) METHOD AND APPARATUS FOR PROVIDING SUPPORT FOR MULTIPLE QOS LEVELS WITHIN A THIRD GENERATION PACKET DATA SESSION

(75) Inventors: Sanjoy Sen, Plano, TX (US); Serge Manning, Plano, TX (US); Chung-Ching Wang, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/454,793

(22) Filed: Dec. 3, 1999

Related U.S. Application Data

(60) Provisional application No. 60/130,618, filed on Apr. 22, 1999.

(51) Int. Cl.[7] .............................................. H04L 12/56
(52) U.S. Cl. ...................................... 370/392; 370/252
(58) Field of Search ................................ 370/252–253, 370/389, 392, 400–402

(56) References Cited

U.S. PATENT DOCUMENTS

| | | | | |
|---|---|---|---|---|
| 5,822,319 A | * | 10/1998 | Nagami et al. | 370/392 |
| 5,987,022 A | * | 11/1999 | Geiger et al. | 370/349 |
| 6,189,033 B1 | * | 2/2001 | Jin et al. | 709/225 |
| 6,253,326 B1 | * | 6/2001 | Lincke et al. | 713/201 |
| 6,295,532 B1 | * | 9/2001 | Hawkinson | 707/4 |
| 6,415,313 B1 | * | 7/2002 | Yamada et al. | 709/200 |
| 6,466,985 B1 | * | 10/2002 | Goyal et al. | 709/238 |

FOREIGN PATENT DOCUMENTS

| | | |
|---|---|---|
| WO | WO 99/13620 | 3/1999 |

OTHER PUBLICATIONS

W. Richard Stevens, TCP/IP Illustrated, vol. 1 The Protocols, 1994, Addison–Wesley, vol. 1, pp. 34–37, 143–145, 225–227.*

P. Almquist, RFC 1349, Jul. 1992, The Internet Engineering Task Force, Network Working Group, pp. 1 and 7.*

M. Engan, "IP Header Compression over PPP", Internet Article, Feb., 1999, pp. 1–9.

S. Blake, "An Architecture for Differentiated Services", Dec. 1, 1998, pp. 1–22.

* cited by examiner

*Primary Examiner*—Chau Nguyen
*Assistant Examiner*—Nittaya Juntima
(74) *Attorney, Agent, or Firm*—Paul W. Fulbright; John D. Crane; Dillon & Yudell LLP

(57) ABSTRACT

A classification application utilizing a table of connection numbers and associated TCP/IP applications is utilized for determining a wireless packet communication, quality of service level by decoding a connection number field of the compressed packet header. Packets carrying different connection numbers can be mapped to different Quality of Service planes. When a non-active TCP connection becomes active, the classification application detects and identifies the connection by reading the connection number field of a compressed TCP/IP header in a packet of the application. The classification application applies the appropriate Quality of Service level as determined from a user database and a list of available Quality of Service levels. If the connection has no table entry, the TCP/IP application is identified based on comparison to a pre-loaded table of port numbers and a new entry is created in the connection number table.

23 Claims, 5 Drawing Sheets

```
If (packet_type ==TYPE_IP) return         //do nothing
Else If (packet_type ==COMPRESSED_TCP)
     {
     If (connection_number same as previous pkt)  return   //nothing
                                                            changed
     Else classify_different_active_flow  //an already-admitted, non-active
                                            TCP session is active again
     }
Else {    //packet_type=UNCOMPRESSED_TCP
     If (new connection_number)    //new TCP session; find out application type
           classify_new_flow                   number in TCP header and add
                                                                    using port
                                                                    to table
     Else If (connection_number not new, but different from
                                                        previous pkt)
           classify_different_active_flow
     }
```

Fig. 5

METHOD AND APPARATUS FOR PROVIDING SUPPORT FOR MULTIPLE QOS LEVELS WITHIN A THIRD GENERATION PACKET DATA SESSION

CROSS REFERENCE TO RELATED APPLICATIONS

This application claims the benefit of Provisional application No. 60/130,618, filed Apr. 22, 1999.

Cross reference is made to commonly assigned U.S. patent application Ser. No. 09/454,017, filed on Dec. 3, 1999, entitled "QoS Framework for CDMA 2000", in which the teachings are incorporated herein by reference.

FIELD OF THE INVENTION

The present invention relates in general to wireless communication networks and particularly to service levels within the communication networks. More particularly, the present invention relates to measuring and providing specific levels of quality of communication within a wireless network.

BACKGROUND OF THE INVENTION

With the exception of Asynchronous Transfer Mode wireless communication, there is no quality of service standards in the wireless communication industry. Quality of Service (QoS) is derived from requirements by communications applications and generally has very specific guidelines in wireline and Asynchronous Transfer Mode network systems. Traditionally, applications that require a certain level of service are contracted for by a customer with a provider. The requirements are set out with pre-defined values capable of being measured and provided by the provider. Typically, the requirements relate to availability of bandwidth, delay, access, priority, exclusivity, etc. QoS architectures provide mechanisms and procedures to measure and provide specific QoS services.

QoS is relatively easy to define in digital circuits and QoS with respect to ATM standards are defined Class of Service 1, 2, 3, and 4. Class 1 is equivalent to a digital private line; Class 2 supports audio conferencing, multimedia and video; Class 3 supports frame relay and Class 4 supports connectionless data protocols.

Acronyms and abbreviations frequently used throughout this disclosure are defined and described below.

"BS" Base Station
"BTS" Base Transceiver Station
"CDMA" Code Division Multiple Access
"datagram" self contained entity of data with no reliance on the source or destination computer for routing information
"End-to-End delay" is the delay experienced by service traffic
"IP" Internet Protocol
"LAC" Link Access Control—utilizes a protocol for data link-level transmission control; the upper sub-layer of IEEE Layer 2 (OSI) protocol that complements the MAC protocol
"MAC" Medium Access Control—lower sub-layer of IEEE Layer 2 (OSI) protocol that supports topology-dependent functions and uses the services of the physical layer to provide services to LAC
"MS" Mobile Station
"PPP" Point-to-Point Protocol
"QoS" Quality of Service—a set of requirements and related service performance that determines a specified degree of performance by an application utilized by a subscriber
"RTP" Real Time Protocol—supports transport of real-time data such as voice and video over packet switched networks
"RLP" Radio Link Protocol
"sr" Service Reference
"TCP" Transmission Control Protocol
"Throughput" is the amount of bandwidth available to an application usually involving error rate, buffer capacity, processing
UDP User Datagram Protocol—normally bundled with IP, provides datagram mode of communication for packet delivery.

QoS in the wireline world is provided on the Internet (a packet based system) utilizing two approaches: qualitative and quantitative. The Qualitative approach is based on differentiated services (Diff-Serv) which is a reservationless model. Diff-Serv with up to 64 per Hop Behaviors (PHB) may be defined by the Type of Service/Diff-Serv (ToS/DS) byte in an IP header into a small number of service types. Priority mechanisms are utilized to provide QoS to packet traffic.

Integrated Services (Int-Serv) provides end to end QoS with by reserving resources for data traffic. RSVP signaling is a protocol that reserves the resources so as to provide the required QoS. Int-Serv is independent of the actual mechanism used to provide the reservations, but Int-Serv specifies generically traffic and path characteristics for a transmission.

A wireless interface standard based on CDMA technology, CDMA2000, is a name that identifies the Telecommunication Industry Association (TIA) standard for third generation features and services for cellular operators. The interface supports second generation interfaces and includes support for multiple channel sizes, circuit and packet data rates up to 2 Mbps, advanced multimedia capabilities, voice services, vocoders and voice over IP.

PPP is the protocol utilized in transporting data packets across the CDMA network. PPP supports Van-Jacobsen (V-J) header compression which is a technique used to shrink 40 byte headers of TCP packets to as little as two to four bytes. A PPP frame is capable of containing packets from other protocols including IP, by adding a protocol field to the frame definition that identifies the type of data packet being carried by the frame.

One approach for supporting CDMA2000 is to maintain a single class of LAC/MAC that provides procedures for handling various QoS requirements. In this approach, with only one set of mechanisms to provide the bandwidth, availability, etc., QoS flexibility is limited. Efficiency is also affected with the need to switch between resource management systems when different QoS levels are required. A user can run multiple TCP/IP applications from a mobile host through one PPP session such as File Transfer, email or World Wide Web browsing. Some TCP/IP applications may have more demanding QoS requirements than others, e.g., response time for WWW browsing should be less than e-mail or FTP. There is a need to differentiate between these TCP/IP applications at the link layer so that a Packet handler may priority-schedule them to the RLP queues or allocate different LAC/MAC physical layer instance (QoS plane).

A user may run multiple IP-based applications such as file transfer, email, WWW browsing or Voice over IP session over one PPP session from a wireless mobile host. Some applications, such as VoIP, may have more stringent QoS requirements than others (such as email) because the response time is more critical. From a wireless resource usage perspective, there is a need to differentiate between these IP applications at the link layer so the packet handler (PH) can schedule, as to priority, to RLP queues or allocate a different LAC/MAC physical layer instance (QoS plane). This classification, based only on DS/ToS byte alone may not be adequate. The application may not be able to mark the DS/ToS byte; applications may mark email and HTTP packets with the same codepoint (DS byte) or ToS byte information and Diff-Serv may not be deployed when CDMA2000 Phase 1 is implemented.

It would be desirable to provide a method and system that would allow a mobile user to run multiple applications over a single PPP session. It would also be desirable to identify a IP application packet encapsulated within a PPP packet and detect IP application changes during a PPP session. It would further be desirable to require no dependence on IP QoS information.

SUMMARY OF THE INVENTION

It is therefore one object of the present invention to provide a method and system for identifying a IP application packet that is encapsulated by a PPP packet.

It is another object of the present invention to provide a method and system that will detect IP application changes during a PPP session.

It is yet another object of the present invention to provide a method and system that will allow multiple applications to operate over a single PPP session.

The foregoing objects are achieved as is now described. A classification application utilizing a table of connection numbers and associated IP application IDs is utilized for determining a wireless packet communication, Quality of Service level by decoding a connection number field of the compressed IP packet header. Packets carrying different connection numbers can be mapped to different Quality of Service planes. For example, when a non-active TCP connection becomes active, the classification application detects and identifies the connection by reading the connection number field of a compressed TCP/IP header in a packet of the application. The classification application applies the appropriate Quality of Service level as determined from a user database and a list of available Quality of Service levels. If the connection has no table entry, the TCP/IP application is identified based on comparison to a pre-loaded table of port numbers and a new entry ID is created in the connection number table.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts a listing of pseudocode comprising the classifier of FIG. 4, in accordance with a preferred embodiment of the present invention;

DETAILED DESCRIPTION OF THE PREFERRED EMBODIMENT

Figure 1:
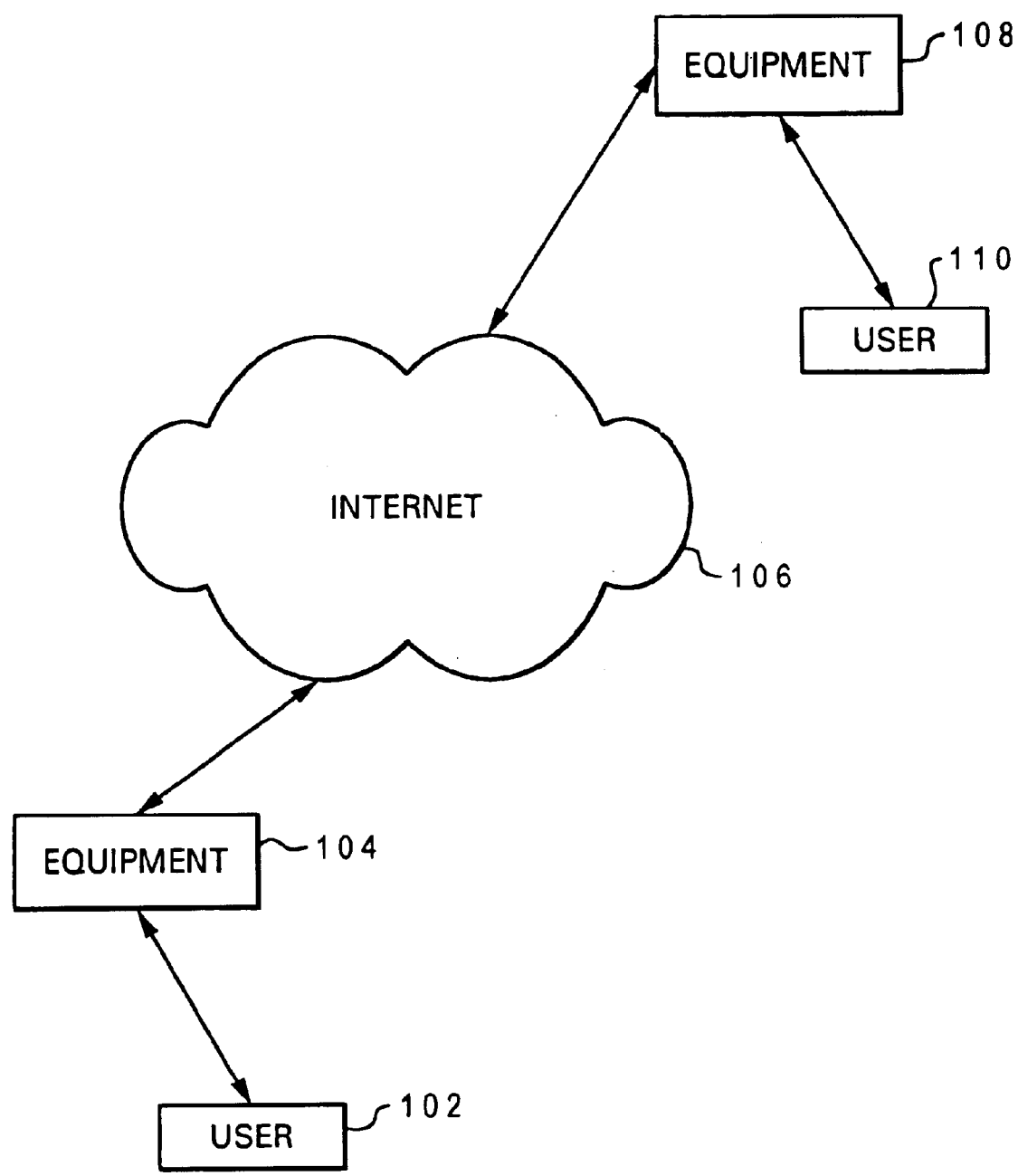
FIG. 1 depicts a wireless communication system in which a preferred embodiment of the present invention may be implemented.

With reference now to the figures, and in particular with reference to FIG. 1, a wireless communication system in which a preferred embodiment of the present invention may be implemented, is depicted. User 102 transmits a radio signal that is received by equipment 104 which then transmits the signal to a connected IP network, in this instance Internet 106. The signal is transmitted via Internet 106 to equipment 108 which is receiving and connecting equipment for user 110.

User 102 may include a wireline as well as a wireless communications device and devices capable of communicating on Internet 106 include wireline, wireless, computing, fax, voice and virtually any IP compatible device. Transmissions between user devices 102 and 110 are processed by the connecting equipment 104 and 108. If user 102 is using a wireless communication device, the connecting equipment would include a transmitting and receiving tower (BTS), a base station controller and a mobile switching center. User 102 can connect to any other user on the IP network as long as the communication protocols of each user device are compatible.

Figure 2:
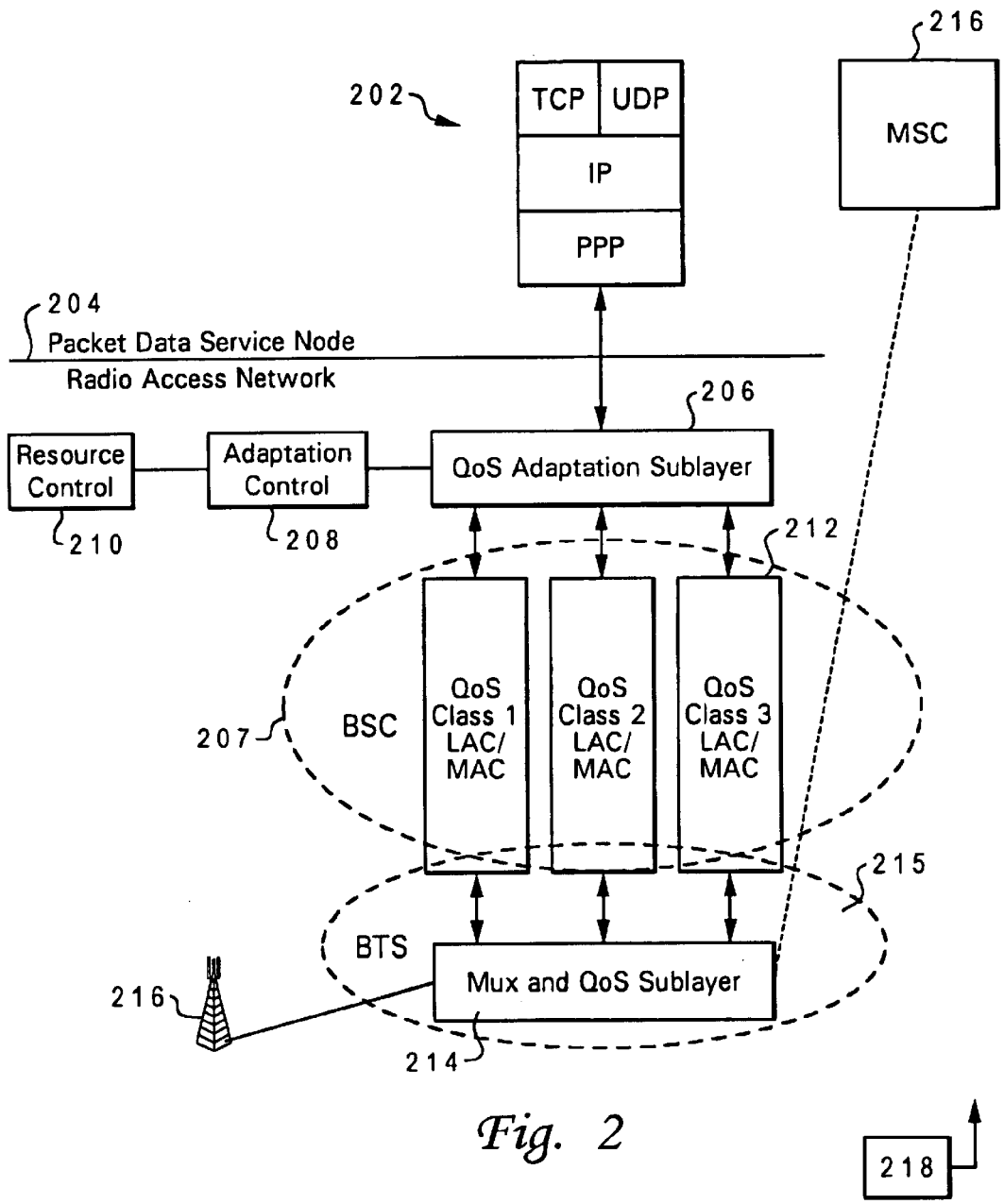
FIG. 2 illustrates a high-level block diagram of a wireless quality of service architecture according to a preferred embodiment of the present invention.

Referring now to FIG. 2, a high-level block diagram of a wireless quality of service architecture according to a preferred embodiment of the present invention, is illustrated. A signal is transmitted over a Packet Data Service node (router) from a connected IP network in the form of IP/PPP data packets 202. Multiple packet data flows having different QoS requirements may be supported under a single PPP connection—different signals requiring different QoS may be transmitted in a single session. Following the progress of IP/PPP packet 202 as it moves from the IP network to a receiving device, packet 202 is routed to BSC 207 via QoS Adaptation Sublayer (QAS) 206. QAS 206 directs packet 202 to one of the LAC/MAC classes, each having different support levels of QoS.

Adaptation control 208 utilizes resource control 210 to determine specific QoS classes for detected and identified signals. Resource control 210 contains a database of user profiles that include class of service for each customer that accesses the system. Adaptation control 208 determines the identity of the signal source and applies the proper QoS class to that signal. An incoming voice signal is transmitted via MSC 216 to Mux and QoS sublayer in BTS 215. The voice signal is then transmitted from BTS 215 to receiving device 218 (e.g., cellphone). All data signals are transmitted through QAS 206.

LAC/MAC 212 instances associated with different QoS classes have different mechanisms controlling the radio resources to achieve corresponding QoS requirements. Different LAC/MAC ARQ and RLP require a different set of dedicated physical layer channels with specific QoS capabilities. The incoming signal from QAS 206 is directed to a particular LAC/MAC within BSC 207 based on the identified required class. In this embodiment QAS 206 is shown as being included in BSC 207. Though BSC 207 is an interface between Radio Access Network locating QAS in BSC 207 is not required for proper operation of the present invention.

QoS architecture includes QoS Adaptation Sublayer (QAS), QoS Adaptation Control (QAC) and multiple LAC/MAC instances of different classes for supporting various QoS requirements. A signal transmission utilizing the QoS architecture of the present invention may be received and sent through an IP network in IP packet form. The signal is routed to the appropriate BS containing a matching peer LAC/MAC and processed by QAS to determine the class of service to supply for the signal. As the class is determined, the signal is then routed through the relevant LAC/MAC instance and the associated class mechanism. The signal is given the pre-determined QoS class as provided for in the user profile and transmitted through the BTS to the target device.

QAS, in a wireless system, buffers and classifies data traffic and directs the classified traffic to a LAC/MAC of the same class. QAC controls the behavior of the QAS and communicates with the Resource Control entity which manages all the resources in the wireless system and is connected to the database containing the user profile.

Figure 3:
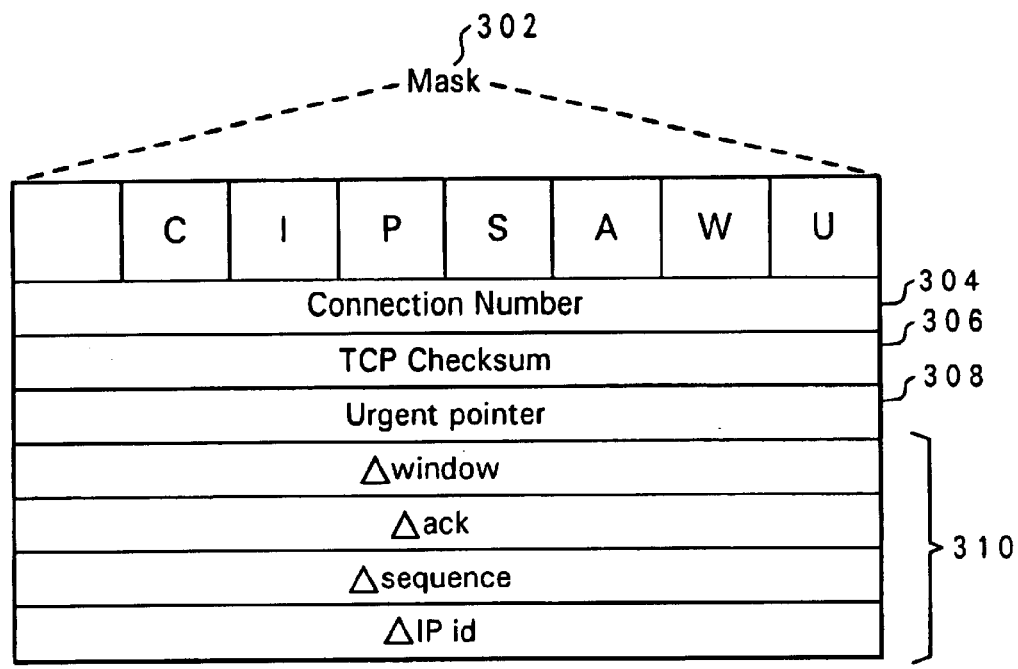
FIG. 3 depicts a format of a compressed TCP/IP packet with compressed header in accordance with a preferred embodiment of the present invention.

Referring to FIG. 3, the format of a compressed TCP/IP packet with compressed header in accordance with a preferred embodiment of the present invention is illustrated. TCP/IP packet 300 is representative of multiple packets included in a single datagram. Change mask 302 identifies which fields actually changed (C allows the connection number to be omitted, S is packet sequence number, A is acknowledge number delta, W—window change delta and U is urgent data delta), connection number 304 is a one byte field utilized for locating the saved copy or the last received packet, TCP checksum 306 is unmodified so an end-to-end data integrity check in the total datagram is valid, Urgent pointer 308 and for each bit set in change mask 302 the amount 310 that the field, associated with the mask bit, changed. Connection number 304 is a field limited to one byte and is able to distinguish up to 256 TCP/IP sessions.

An IP packet is sent over a serial line and is passed through a V-J Header compressor. The compressor checks if the protocol is TCP and marks the packets as TYPE_IP if the packets are non-TCP or un-compressible and passed to a PPP framer. If a matching connection is found, the incoming packet is compressed, the un-compressed packet header is copied into the array and a COMPRESSED_TCP is sent to the PPP framer. When the compressor receives the first packet of a new TCP session it generates an UNCOMPRESSED_TCP type packet with the TCP/IP header exactly the same as the original header except that the Protocol ID field is replaced by (newly assigned) connection number 304. The packet of type UNCOMPRESSED_TCP then sent to the framer. The PPP header must contain the indication of the packet type.

Client-server applications utilize well-known TCP ports in a server and a few are listed in the connection number table below.

| TCP/IP Application | TCP Port |
|---|---|
| FTP: data | 20 |
| FTP: Control | 21 |
| Telnet | 23 |
| SMTP | 25 |
| HTTP | 80 |

Checking for port numbers in the source or destination port field of the TCP header and comparing to the entries in the connection table provides an identity check for the TCP/IP application.

Figure 4:
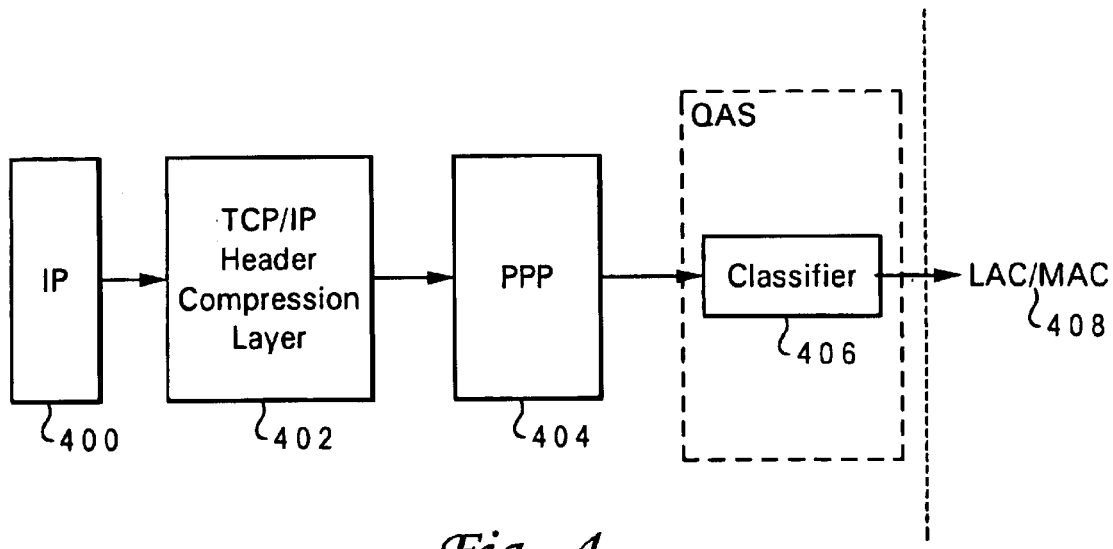
FIG. 4 illustrates a high-level block diagram of signal flow through a classifier in accordance with the present invention, is illustrated

Referring now to FIG. 4, a high-level block diagram of signal flow in accordance with the present invention, is illustrated. A complete PPP packet is shown being received into LAC/MAC 408 where IP 400 represents IP data preceded by TCP/IP header 402 and both being encapsulated inside PPP packet 404. The structure of the PPP packet is the same as that depicted in FIG. 3.

Classifier 406 is stored and operative within the QAS and, in this embodiment, located in a Base Station (not shown). Classifier 406 maintains a table of pre-determined connection numbers (see FIG. 3) and the TCP/IP application associated with each connection number. Datagrams having different connection numbers may be mapped to different, corresponding "QoS planes" (a pre-determined level of service).

Only one TCP connection is active at any time, thus the classifier can decode the connection number field in the TCP/IP header 402 and can determine which TCP/IP flow is active at any time. As a different TCP connection becomes active the classifier compares the value in the connection number field. If the connection number is in the table, the QoS plane associated with the connection number is applied to the packet. However, if the connection number is new (no entry), a new TCP/IP session is indicated. The TCP/IP application is identified from the source port number, (the DS-byte information may also be negative to identify the QoS level to be supportred) and a new entry for this connection number is created in the table.

Referring now to FIG. 5, a listing of pseudocode comprising the classifier of FIG. 4, in accordance with a preferred embodiment of the present invention, is depicted. If a packet is received and it is identified as the same type as the previously received packet the classifier is inactive. If the packet type received has a compressed TCP/IP header, the classifier checks the connection number and if the number is the same as the previous packet nothing is changed. However if the number is the same as a previously received packet but not immediately following, the packet is determined to be an already-admitted TCP session that had become non-active and is now active.

If the connection number is determined by the classifier to be a new connection number, the classifier determines the application type (and QoS requirements) by utilizing the port number in the TCP header. The new packet data flow id is then added to the connection number table. On the other hand if the connection number is not new but is different from the preceding packet, the classifier classifies the packet as a different but active data flow within the same PPP session.

The identifier scheme may be modified to include support for compressed RTP/UDP/IP headers as well. If the PDSN supports IP header compression (a general framework incorporating TCP/IP and RTP/UDP/IP headers) and IP header compression for PPP, this scheme can be extended to differentiate between TCP/IP header compressed packets and RTP/UDP/IP header compressed packets within the same PPP session.

Figure 6:
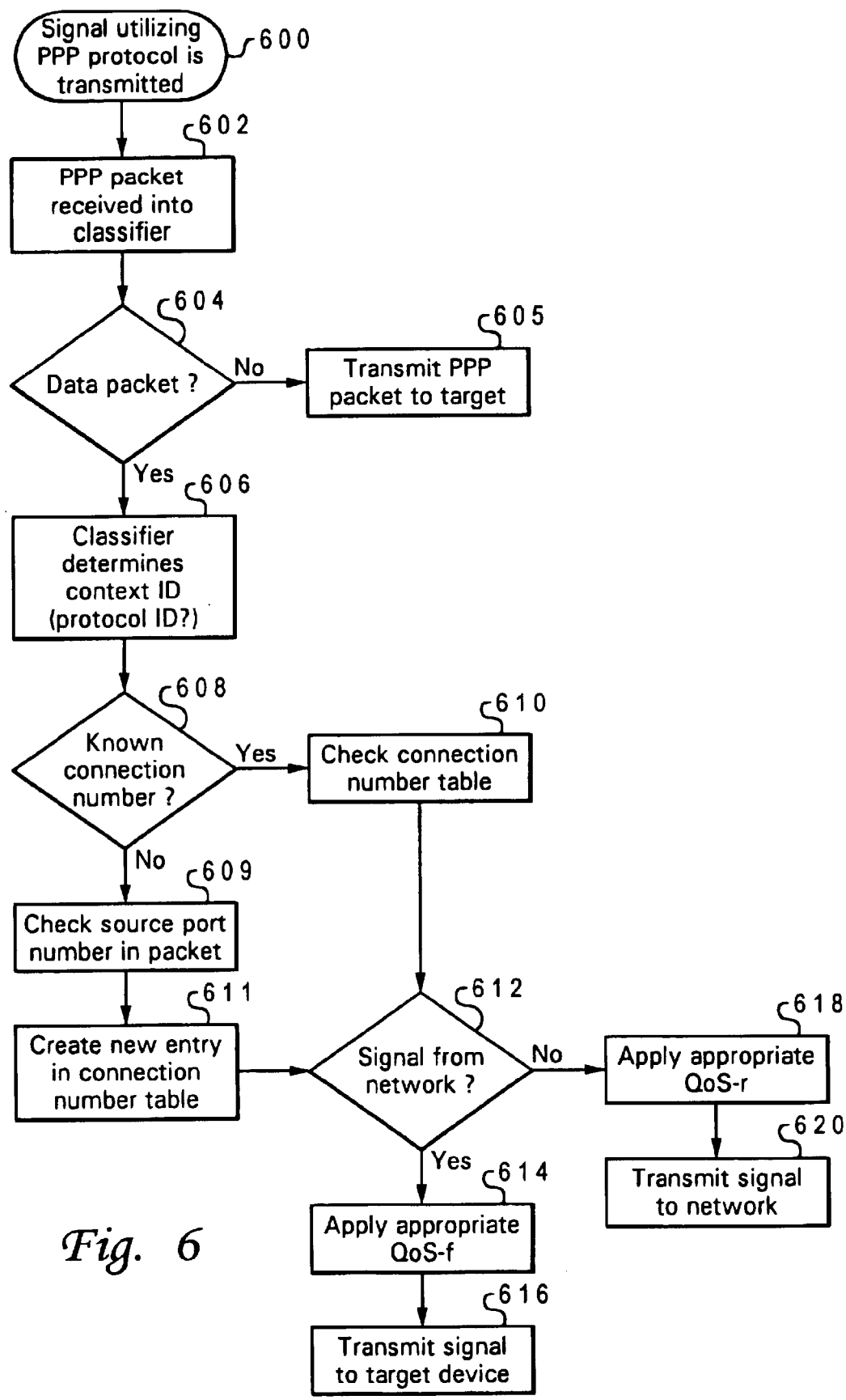
FIG. 6 illustrates a high-level flow diagram in accordance with a preferred embodiment of the present invention.

Referring to FIG. 6, a high-level flow diagram of a method for classifying a received signal in accordance with a preferred embodiment of the present invention, is illustrated. The process begins with step 600, which is depicts a signal being transmitted, either from a network or from a wireless device. The process passes to step 602, which illustrates the signal being received, in the form of a PPP packet, into the classifier. If the signal is "from the air," meaning transmitted to a BTS from a device not on the network, the signal is classified and passed through the appropriate LAC/MAC and sent onto the network. If the signal is "to the air" meaning a signal received into the Base Station from the network, the signal is classified and passed through the LAC/MAC and sent to the target device.

The process continues to step 604, which depicts a determination of whether the packet is a data packet or a Voice over IP (VoIP) packet. If the packet is a VoIP packet, the process passes to step 605, which illustrates the VoIP packet being transmitted either to the network or target device. A VoIP packet has priority over data packets and needs to be scheduled as soon as possible without being backlogged by a large TCP data packet. If the packet is a data packet, the process instead proceeds to step 606, which depicts the classifier determining the context ID of the packet from the IP Header Compression layer.

IP Header Compression (IPHC) protocol includes TCP/IP header compression extension of Van Jacobsen's TCP/IP header compression and RTP/UDP/IP header compression. It is suitable for lossy links (e.g., wireless link) and has a separate context space for TCP and RTP/UDP headers. IPHC defines 9 types of Protocol ID field for PPP packets distinguishing between headers such as a compressed TCP/IP header, a compressed RTP header, a compressed UDP header, etc. IPHC can be used to distinguish between compressed TCP/IP header (data packets) and compressed RTP/UDP/IP packets (real time packets) for MAC state transition based on priority.

The process continues from step 606 to step 608, which illustrates a determination of whether the context corresponds to a known connection number. The QoS classifier maps the TCP/IP packet stream to a QoS class based on destination address and destination port. The IPHC maps the TCP/IP packet stream to a context ID. The context ID is utilized in the QoS adaptation Interface to classify PPP packets based on the context ID to QoS class mapping. If the determination is made that the connection number is known, the process passes to step 610, which depicts the QoS adaptation interface (or QoS Adaptation Sublayer) checking the connection number table for a corresponding port and classifying the packet based on the context ID. The process then passes to step 612, which illustrates a determination of whether the signal enters the classifier from the network or from the air (signal transmitted to a base station).

Returning to step 608, if the determination is made that the connection number is not known, the process proceeds instead to step 609, which depicts the classifier checking the source port number against the connection number to determine the type of TCP/IP data session to which the packet belongs. The process continues to step 611, which illustrates the classifier creating a new entry in the connection number table accompanied by a corresponding QoS class of service as determined by the classifier. The ID of the user and the type of packet is combined to provide the appropriate class of QoS.

The process then passes to step 612, which depicts a determination of whether the signal is received from the connected network. If the signal is from the network, the process proceeds to step 614, which illustrates applying the appropriate forward QoS to the packet (QoS may be different in either direction based on the type of packet and the agreement between the user and the operator). The process continues to step 616, which depicts the signal being transmitted to the target device. If the determination is made that the signal is from a connected device, the process proceeds instead to step 618, which illustrates applying the appropriate reverse QoS to the packet. The process then continues to step 620, which depicts the Base Station transmitting the signal onto the connected network.

It is important to note that while the present invention has been described in the context of a fully functional telecommunications system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for classifying data in a data packet, comprising the steps of:

detecting an active data packet connection, including a data pack;

decoding a connection number field in a compressed header of said data packet to determine a connection number for said data packet;

providing a table comprising a first set of data and second set of data, said first set of data containing a plurality of identified connection numbers, and said second set of data containing a corresponding quality of service plane for each identified connection number in the table, wherein each of said plurality of identified connection numbers is an identifier of a particular data packet connection; and mapping within said table said connection number for said data packet to a corresponding quality of service plane.

2. The method in claim 1, wherein said active data packet connection is a point to point protocol or user datagram protocol connection.

3. The method in claim 1, wherein providing said table of identified connection numbers, further comprises:

associating each said connection number with a specific, active Transmission Control Protocol/Internet Protocol application.

4. The method in claim 1, wherein providing said table of identified connection numbers, further comprises:

associating each said connection number with a specific, active Real Time Protocol/User Datagram protocol/Internet Protocol application.

5. The method in claims 3 or 4, further comprising:

determining whether said connection number is present in said table of identified connection numbers.

6. The method in claim 3, further comprising:

utilizing a port number in a TCP/IP header in said packet to identify application type; and mapping said application to a Quality of Service plane.

7. The method in claims 6, further comprising:

creating a new entry in said table if said connection number is not present.

8. The method in claim 6, further comprising:

utilizing a context ID determined from said table of connection numbers to classify said Point to Point Protocol packet.

9. An apparatus for classifying data in a data packet, comprising:

a switch for processing packet data;

decoding logic within said switch for decoding a connection number field in a compressed header of a datagram;

a table of connection numbers for identified applications comprising a first set of data and second set of data, said first set of data containing identified connection numbers and said second set of data containing a corresponding quality of service plane for each identified connection number in the table, wherein each of said identified connection numbers is an identifier of a particular data packet connection;

comparison logic for determining whether said connection number decoded by the decoding logic is present in said table;

logic for creating a new entry in said table if said connection number is not present; and mapping logic for mapping, within said table, a connection number for a datagram to a corresponding quality of service plane.

10. The apparatus in claim 9, wherein said table of connection numbers for identified applications, further comprises:

each identified connection number having an associated Transmission Control Protocol/Internet Protocol application for comparing incoming packet data connection numbers to said connection number.

11. The apparatus in claim 10, wherein each said identified connection number is associated with an active Transmission Control Protocol/Internet Protocol application comparing incoming packet data connection numbers to said connection number of said application, further comprises:

logic means for determining whether said application connection number is present in said table of connection numbers for identified applications.

12. The apparatus in claim 9, wherein said table of connection numbers for identified applications, further comprises:

each identified connection number is associated with an active Real Time Protocol/User Datagram Protocol/ Internet Protocol application for comparing incoming packet data connection numbers to said connection number of said application.

13. The apparatus in claim 11, further comprising:

logic means for utilizing a port number in a TCP/IP header to identify application type; and logic means for mapping said application to a Quality of Service plane.

14. The apparatus in claims 11 or 12, further comprising:

logic means for creating a new entry in said table of connection numbers for identified applications.

15. The apparatus in claims 11 or 12, further comprising:

logic means for utilizing a context determined from said table of connection numbers to classify a Point to Point Protocol packet.

16. In a switch, a program of instructions executable by a computer embodied in a computer-readable medium and associated with a telecommunication system for classifying data in a data packet, comprising:

instructions embodied in said computer-readable medium for detecting an active data packet connection, including a data packet;

instructions embodied in said computer-readable medium for decoding a connection number field in a compressed header of said packet to determine a connection number for said data packet wherein said connection number is an identifier of a particular data packet connection; and instructions embodied in said computer-readable medium for mapping said connection number for said data packet to a corresponding quality of service plan.

17. The program of instructions of claim 16, wherein instructions for identifying said active data packet connection are instructions for identifying a point to point protocol or user datagram protocol connection.

18. The program of instructions of claim 16, wherein decoding said connection number field in a compressed header of said Point to Point Protocol packet, further comprises:

instructions embodied in said computer-readable medium for providing a table of identified connection numbers wherein each said connection number is associated with a specific, active Transmission Control Protocol/ Internet Protocol application.

19. The program of instructions of claim 18, further comprising:

instructions embodied in said computer-readable medium for providing a table of identified connection numbers wherein each said connection number is associated with a specific, active Real Time Protocol/User Datagram protocol/Internet Protocol application.

20. The program of instructions of claim 18 or 19, further comprising:

instructions embodied in said computer-readable medium for determining whether said connection number is present in said table of identified connection numbers.

21. The program of instructions of claim 18, further comprising:

instructions embodied in said computer-readable medium for utilizing a port number in a TCP/IP header in said packet to identify application type; and instructions within said instruction bearing media for mapping said application to a Quality of Service plane.

22. The program of instructions of claim 21, further comprising:

instructions embodied in said computer-readable medium for creating a new entry in said table if said connection number is not present.

23. The program of instructions of claim 21, further comprising:

instructions embodied in said computer-readable medium for utilizing a context ID determined from said table of connection numbers to classify said Point to Point Protocol packet.

* * * * *

UNITED STATES PATENT AND TRADEMARK OFFICE
CERTIFICATE OF CORRECTION

PATENT NO. : 6,765,909 B1 Page 1 of 1
DATED : July 20, 2004
INVENTOR(S) : Sen et al.

It is certified that error appears in the above-identified patent and that said Letters Patent is hereby corrected as shown below:

Column 8,
Line 8, replace "pack;" with -- packet; --.

Signed and Sealed this

Tenth Day of January, 2006

JON W. DUDAS
*Director of the United States Patent and Trademark Office*